(No Model.)
F. SCHUMACHER.
COMPRESSED AIR MECHANISM FOR VEHICLES OR OTHER DEVICES.
No. 601,285. Patented Mar. 29, 1898.
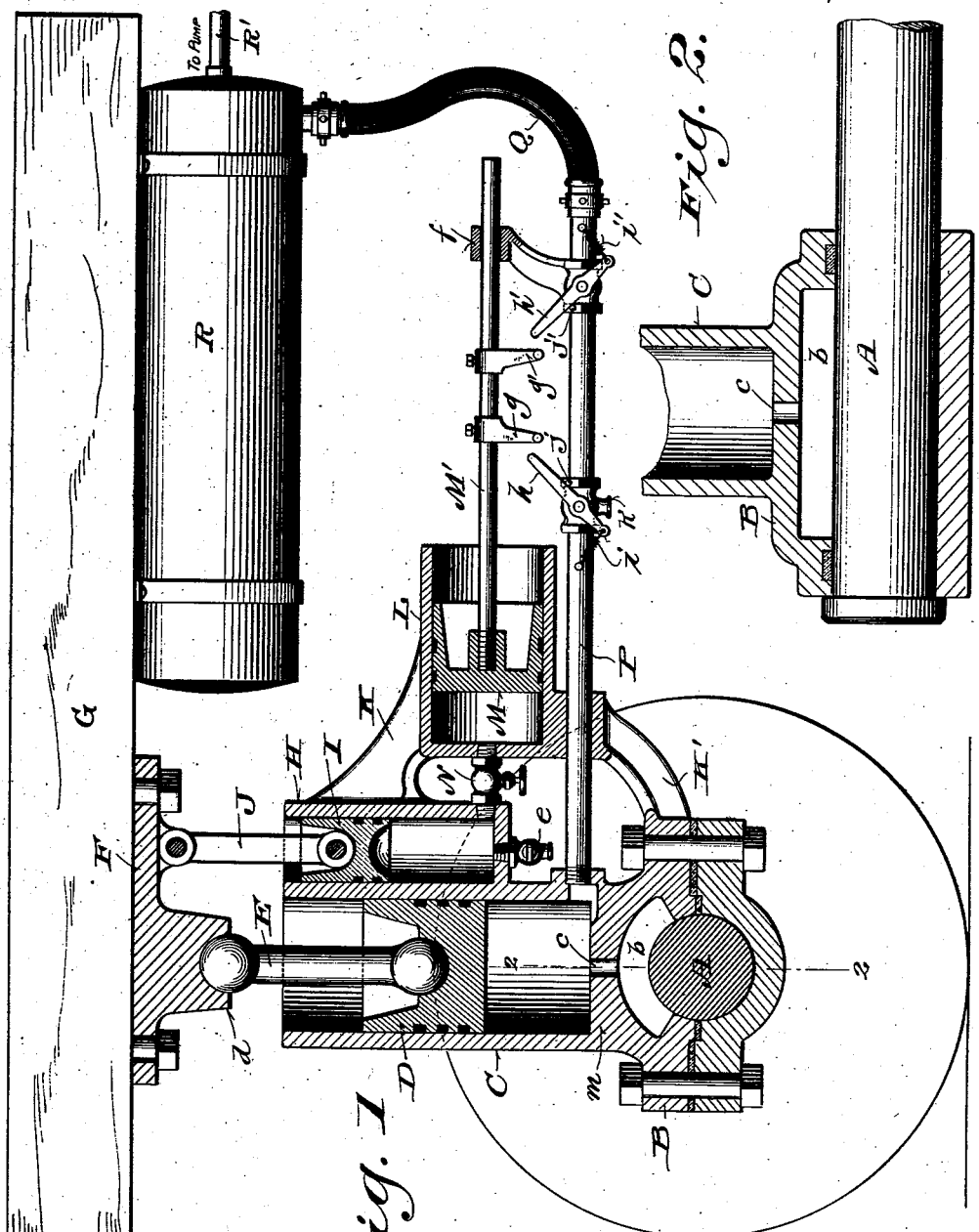
Witnesses:
Geo. W. Young.
N. E. Oliphant
Inventor:
Ferdinand Schumacher
By H. G. Underwood
Attorneys.

UNITED STATES PATENT OFFICE.

FERDINAND SCHUMACHER, OF NAPERVILLE, ILLINOIS.

COMPRESSED-AIR MECHANISM FOR VEHICLES OR OTHER DEVICES.

SPECIFICATION forming part of Letters Patent No. 601,285, dated March 29, 1898.

Application filed April 28, 1897. Serial No. 634,208. (No model.)

*To all whom it may concern:*

Be it known that I, FERDINAND SCHUMACHER, a citizen of the United States, and a resident of Naperville, in the county of Du Page and State of Illinois, have invented certain new and useful Improvements in Compressed-Air Mechanism for Vehicles or other Devices; and I do hereby declare that the following is a full, clear, and exact description thereof.

My invention contemplates reduction of friction as well as absorption of vibration; and it consists in provision for interposition of a volume of compressed air between a load and a rotative carrier, automatic regulation of the amount of compressed air necessary in sustaining said load at a predetermined elevation, and the general construction and arrangement of parts herein set forth, all of which is more particularly described with reference to the accompanying drawings and subsequently claimed.

Figure 1 of the drawings illustrates an application of my invention, the structural details being shown in side elevation and section. Fig. 2 represents a sectional view indicated by line 2 2 in the preceding figure.

Referring by letter to the drawings, A represents a carrier in the form of an axle constituting part of a truck or other running-gear, although in some applications of my invention said carrier may be a rotary shaft of a stationary machine.

Each box or chamber constituting a bearing for the carrier has its upper portion B hollowed out to form an air-space $b$ of suitable area over said carrier, and this air-space has communication through a port $c$ with a cylindrical pot C, in which an air-tight piston D has play. Each bearing may be made air-tight by suitably-arranged packing, as herein shown. The upper end of the piston is provided with a central socket for the lower ball end of a rod E, and the upper ball end of the rod engages a depending socket-lug $d$ of a plate F, made fast to the under side of a platform G, the latter, the parts attached thereto, and weight or force thereon constituting, in this instance, what is hereinafter designated as the "load."

As herein shown, the cylindrical pot C may constitute a vertical extension of the upper portion B of the aforesaid box or chamber. Shown in one piece, with the pot C parallel thereto, is another cylindrical pot H, that is provided at its lower end with a relief-valve $e$ and contains an air-tight piston I, connected by a link J with the plate F, above specified.

Brackets K K' are shown connecting the upper portion of chamber B and the secondary pot H with a horizontal cylindrical vessel L, that is open at its outer end and has its closed end connected by a valve-coupling N with the lower portion of said secondary pot.

An air-tight piston M in vessel L is provided with a rod M', that extends through the open end of vessel L and has loose play in a guide $f$, herein shown supported on an air-conveyer pipe P, that is coupled to the lower portion of pot C, the bracket K' being provided with an eye in which said pipe has support. The piston-rod is provided with tappets $g$ $g'$, that operate against levers $h$ $h'$ of valve-couplings constituting parts of the air-conveyer pipe P, the latter being herein shown coupled to a flexible pipe Q, that is also coupled to a reservoir R for a reserve supply of compressed air.

For convenience of illustration the reservoir R is shown suspended from the platform G, and compressed air from a suitable pump is supplied to said reservoir through a pipe R', herein shown at one end of the same; but in some instances there may be direct connection between the conveyer P and said air-pump.

The valve-levers $h$ $h'$ are operated by the tappets $g$ $g'$ against the resistance of springs $i$ $i'$, arranged as herein shown, and stops $j$ $j'$ are also shown arranged to limit movement of said levers incidental to contraction of said springs.

The showing herein made serves as a full illustration of the several features embodied in my invention; but in matter of structural detail and arrangement of parts said invention is susceptible of considerable variation according to the nature of its application.

In practice a volume of compressed air from the reservoir R is let into the pot C through the conveyer P, the valve-lever $h'$ being moved in the proper direction to accomplish this result and thereafter returned to normal position, it being understood that the other lever *h* is only operative to control a relief-nozzle *k* of the valve-coupling to which it pertains. The quantity of air admitted to pot C is sufficient to move the piston D with the load to a desired elevation from the carrier—such, for instance, as the elevation herein shown—at which time the pressure of said load is exerted on the volume of compressed air confined between said piston and carrier. This pressure is equalized in the hollow portion *b* of the carrier box or chamber and pot C, providing the areas on opposite faces of the intervening partition *m* are equal. Hence provision is made for a cushion of compressed air intermediate of the load and its carrier, the latter having a certain proportion of its surface exposed to said air in which it has proportional antifriction rotation.

The proportion of surface areas on which upward and downward pressures are exerted intermediate of the load and carrier may vary, as the exigencies for keeping said carrier air-tight require more or less surface area in the hollow portion *b* of the box or chamber incasing said carrier; but such variations are correspondingly detrimental to the antifrictional advantages of the invention in proportion as the difference in said surface areas increase.

The lower end of the piston I in the pot H is shown hollowed out to obtain a greater vertical air-space below said piston than that under piston D in pot C, and said piston I operates in conjunction with the adjacent confined volume of air and mechanism herein set forth as a governor to control the supply of reserved compressed air necessary to maintain the load at an average predetermined elevation from the carrier in case said load is subjected to variable pressure conditions. The pot H being connected to the vessel L by the valve-coupling N, the rapidity of air passing from one to the other may be readily controlled, and excess pressure in either may be relieved at any time by opening the valve *e* of the former. Assuming that the load is gradually increased, the downward tendency of piston I will tend to compress the air in cylinder H and vessel L, and the pressure thus obtained will operate upon piston M to move the same in an outward direction, causing its rod-tappet *g'* to operate valve-lever *h'* and thus establish connection between reservoir R and pot C to supply an additional quantity of compressed air sufficient to overcome the increased load and lift the latter to the predetermined average height, it being understood that the pressure of air in said reservoir is at all times greater than that existing in said pot. As the load ascends there is lift of piston I, and the tendency to create a vacuum in vessel L creates a suction on piston M to restore the same to normal position. Should the load be lightened and tend to ascend to higher than average predetermined elevation, inward movement of piston M, due to the cause aforesaid, will result in its rod-tappet *g* operating valve-lever *h* to effect a discharge of the surplus compressed air through the relief-nozzle *k* of the corresponding valve-coupling. It is also to be understood that the volume of compressed air intermediate of the load and carrier serves to absorb vibration, and thus operates as a spring. If by reason of extraordinary momentary concussion of the load piston D should descend entirely or to very near the bottom of pot C, there will be a corresponding compression of the air confined between piston I and bottom of pot H, and owing to the slow escape of this air through valve-coupling N into vessel L sufficient pressure on piston M to cause an operation of tappet *g'* against valve-lever *h'* cannot be obtained during said momentary concussion. Therefore said load will be again elevated to the average predetermined height as soon as the air in pots C H has opportunity to again expand.

Any suitable provision may be had for bracing the apparatus herein described, so that the rod E and link J will always maintain a vertical position.

Having thus described my invention, what I claim as new, and desire to secure by Letters Patent, is—

1. A rotative carrier, its load and provision for an automatically-regulated volume of compressed air intermediate of the load and carrier, the latter having a certain proportion of its surface exposed to said air in which it has proportional antifriction rotation.

2. The combination of a rotative carrier, a box or chamber for the carrier having a hollow portion constituting an air-space, a pot having communication with said air-space and also with a source of compressed air, an air-tight piston in the pot, a load exertive on the piston, and mechanism operative to automatically regulate the volume of compressed air opposed to the piston in proportion to variable pressure of the load.

3. The combination of a rotative carrier, a box or chamber for the carrier having a hollow portion constituting an air-space, a pot having communication with said air-space and also with a source of compressed air, an air-tight piston in the pot, a load exertive on the piston, mechanism operative to automatically regulate the volume of compressed air opposed to the piston in proportion to variable gradual pressure of the load, and suitable means for rendering momentary load concussion non-effective on the air-regulating mechanism.

4. The combination of a rotative carrier, a box or chamber for the carrier having its upper portion hollowed out to form an air-space, a vertical pot having communication with said air-space, an air-tight piston in the pot, a load exertive on the piston, another vertical pot provided with a relief-valve and containing an air-tight piston also under direct pressure of the load and having its working face exertive on a confined volume of atmospheric air, a horizontal vessel open at one end and having its closed end in valve-coupling with the pot containing atmospheric air, an air-tight piston in the vessel provided with a guide-supported rod, a pair of tappets on the piston-rod, and a conveyer connecting the air-space intermediate of the first-named piston and carrier with a source of compressed air, a relief mechanism for the conveyer operated in one direction by one of said tappets, and a cut-off and supply mechanism of said conveyer operated in one direction by the other of said tappets.

In testimony that I claim the foregoing I have hereunto set my hand, at Mayville, in the county of Dodge and State of Wisconsin, in the presence of two witnesses.

FERDINAND SCHUMACHER.

Witnesses:
WILLIAM KUNZ,
FRIEDERICH GETTE.